(12) United States Patent
Horiguchi

(10) Patent No.: US 8,781,444 B2
(45) Date of Patent: Jul. 15, 2014

(54) COMMUNICATION APPARATUS AND METHOD

(75) Inventor: Tomoya Horiguchi, Inagi (JP)

(73) Assignee: Kabushiki Kaisha Toshiba, Minato-ku, Tokyo (JP)

(*) Notice: Subject to any disclaimer, the term of this patent is extended or adjusted under 35 U.S.C. 154(b) by 483 days.

(21) Appl. No.: 13/071,574

(22) Filed: Mar. 25, 2011

(65) Prior Publication Data

US 2012/0075743 A1    Mar. 29, 2012

(30) Foreign Application Priority Data

Sep. 28, 2010 (JP) ................. 2010-217599

(51) Int. Cl.
- H04M 1/65 (2006.01)
- G06F 12/00 (2006.01)
- H04L 12/56 (2006.01)
- G06F 1/32 (2006.01)

(52) U.S. Cl.
CPC .......... *H04L 47/18* (2013.01); *H04L 47/30* (2013.01); *H04L 47/266* (2013.01); *Y02B 60/126* (2013.01); *H04L 49/9084* (2013.01); *G06F 1/3278* (2013.01); *Y02B 60/31* (2013.01)
USPC ............... 455/412.1; 379/88.1; 711/154

(58) Field of Classification Search
None
See application file for complete search history.

(56) References Cited

U.S. PATENT DOCUMENTS

| | | | |
|---|---|---|---|
| 6,665,375 B1 * | 12/2003 | Forlenza et al. | 379/52 |
| 6,731,625 B1 * | 5/2004 | Eastep et al. | 370/352 |
| 6,754,181 B1 * | 6/2004 | Elliott et al. | 370/252 |
| 7,444,383 B2 * | 10/2008 | Horvitz | 709/207 |

FOREIGN PATENT DOCUMENTS

| | | |
|---|---|---|
| JP | 9-83579 A | 3/1997 |
| JP | 2000-347828 A | 12/2000 |
| JP | 2001-350738 A | 12/2001 |
| JP | 2002-57672 A | 2/2002 |
| JP | 2003-076497 A | 3/2003 |
| JP | 2003-143057 A | 5/2003 |
| JP | 2004-320153 | 11/2004 |
| JP | 2008-204268 A | 9/2008 |

OTHER PUBLICATIONS

Japanese Office Action dated Aug. 21, 2012 from corresponding JP Application No. 2010-217599, 6 pages.
Japanese Office Action dated Nov. 20, 2012 (with English translation) from corresponding JP Application No. 2010-217599, 7 pages.

* cited by examiner

*Primary Examiner* — K. Wong
(74) *Attorney, Agent, or Firm* — Ohlandt, Greeley, Ruggiero & Perle, L.L.P.

(57) ABSTRACT

According to one embodiment, a communication apparatus includes a storage unit, a state detecting unit, a communication unit, and a communication control unit. The storage unit configured to store information. The state detecting unit configured to detect, at least one time during an operation of the communication apparatus, whether the storage unit is in a busy state in which no data writing is allowed, or in a ready state in which data writing is allowed. The communication unit configured to perform communication with a destination communication apparatus. The communication control unit configured to control the communication unit to inform the destination communication apparatus that a data receiving operation is stopped for a first time period, if the state detection unit detects that the storage unit has entered the busy state.

13 Claims, 3 Drawing Sheets

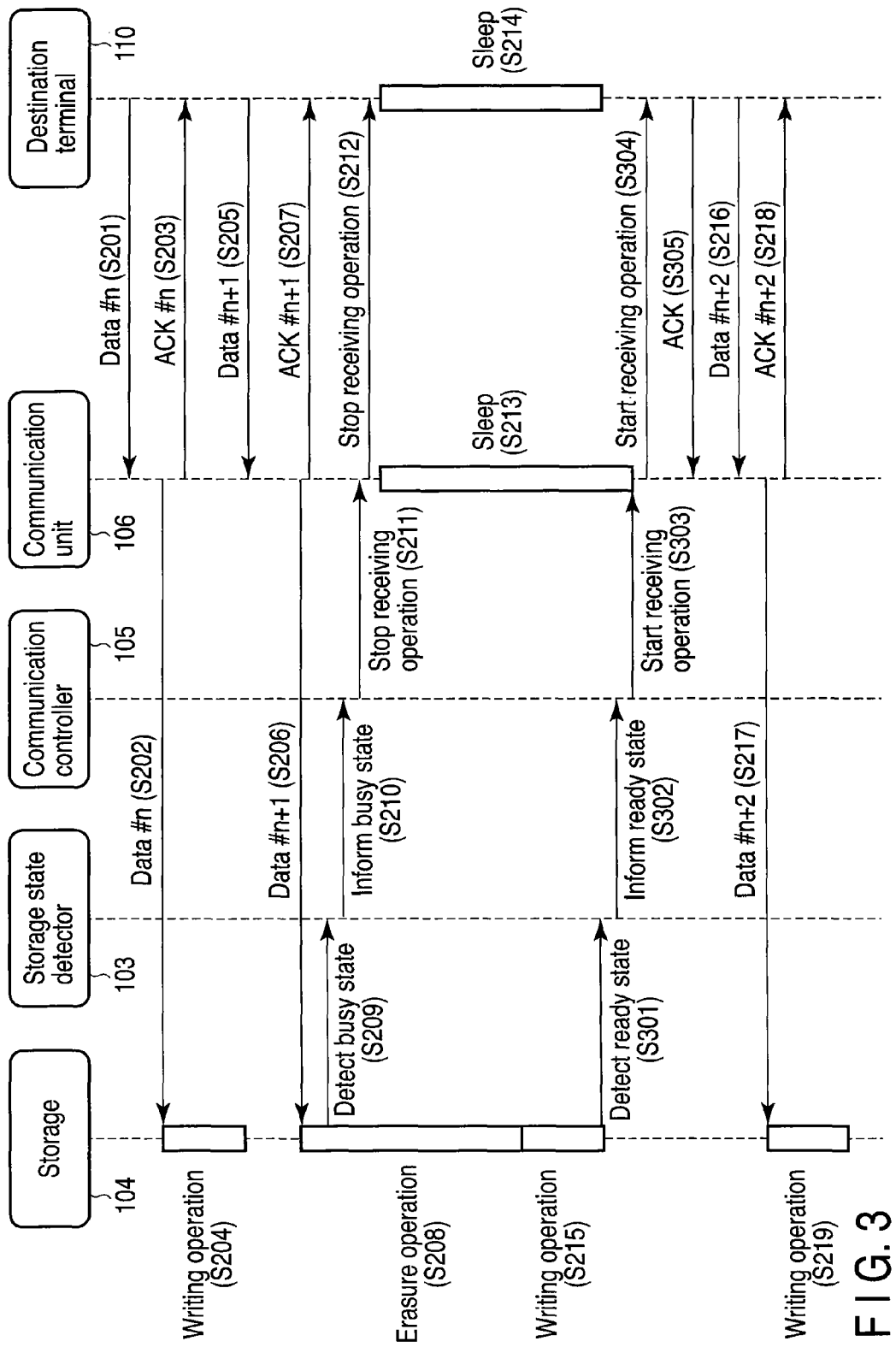
F I G. 3

COMMUNICATION APPARATUS AND METHOD

CROSS-REFERENCE TO RELATED APPLICATIONS

This application is based upon and claims the benefit of priority from Japanese Patent Application No. 2010-217599, filed Sep. 28, 2010; the entire contents of which are incorporated herein by reference.

FIELD

Embodiments described herein relate generally to a communication apparatus with a storage function associated with data communication control, and a communication method for realizing the function.

BACKGROUND

In the prior art, consumption of power is reduced by, for example, determining a transmission interval between the current packet and the subsequent packet using a constant interval, an increasing function, a decreasing function or a periodical function, informing a destination terminal of the determined transmission interval, and stopping data transmission/reception.

However, in the prior art, to realize low power consumption while satisfying the latency and throughput requests from the higher-level application, information indicating whether an increased or decreased transmission rate is to be requested in future, information indicating whether a transmission request is issued periodically, etc., are needed. However, these information items are insufficient to cope with an abrupt state such as a storage busy state. Therefore, data transmission/reception cannot be interrupted at an appropriate time and low power consumption cannot be realized.

BRIEF DESCRIPTION OF THE DRAWINGS

FIG. 3 is an exemplary sequence chart useful in explaining exchange of information between the modules in the communication apparatus of the embodiment and a destination terminal in a way different from that of FIG. 2.

DETAILED DESCRIPTION

The communication apparatus and method according to an embodiment will be described in detailed with reference to the accompanying drawings. In the embodiment, like reference numbers denote like elements, and duplicate explanations will be avoided assuming that the like elements perform like operations.

Figure 1:
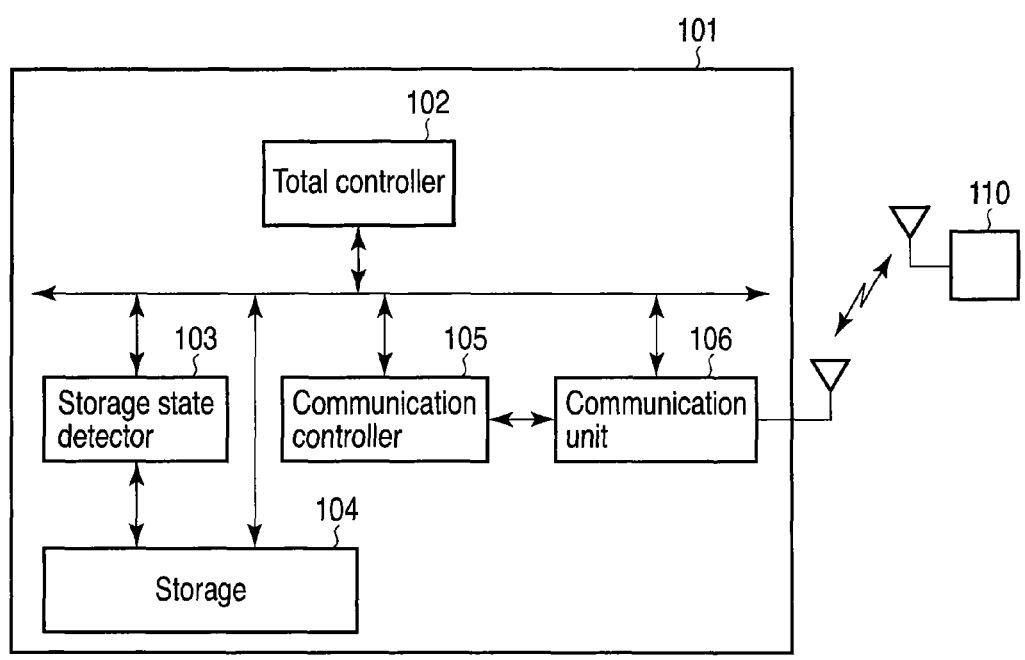
FIG. 1 is an exemplary block diagram showing a communication apparatus according to an embodiment.

In general, according to one embodiment, a communication apparatus includes a storage unit, a state detecting unit, a communication unit, and a communication control unit. The storage unit configured to store information. The state detecting unit configured to detect, at least one time during an operation of the communication apparatus, whether the storage unit is in a busy state in which no data writing is allowed, or in a ready state in which data writing is allowed. The communication unit configured to perform communication with a destination communication apparatus. The communication control unit configured to control the communication unit to inform the destination communication apparatus that a data receiving operation is stopped for a first time period, if the state detection unit detects that the storage unit has entered the busy state. Referring first to FIG. 1, the communication apparatus according to the first embodiment will be described. In the following description, the communication apparatus will also be referred to as "the communication terminal" or simply as "the terminal."

A communication apparatus 101 (also, a communication terminal 101) performs data communication with a destination communication apparatus 110 (also, a destination communication terminal 110, or a destination terminal 110). The communication apparatus 101 comprises a total controller 102, a storage state detector 103, storage 104, a communication controller 105 and a communication unit 106.

The total controller 102 performs, for example, issuing of commands to various modules (elements) incorporated in the communication apparatus 101, and control of data transfer between modules.

The storage 104 is a module capable of storing, for example, data. The storage 104 can simultaneously erase a great amount of data, and is, for example, a flash memory, a hard disk drive (HDD), or a digital versatile disk (DVD). The flash memory is, for example, a NAND type memory, a NOR type memory, or flash electrically erasable and programmable ROM (flash EEPROM).

The storage state detector 103 is a module for monitoring the state of the storage 104. The storage state detector 103 determines whether the storage 104 is in a write ready state, or in a busy state in which it is currently used and therefore writing of data therein is temporarily interrupted. During the operation of the communication apparatus 101, the storage state detector 103 executes state detection at least one time. As the number of state detections by the storage state detector 103 is increased, the accuracy of state detection is enhanced. The storage state detector 103 will be described in more detail later.

The communication controller 105 controls the communication unit 106. More specifically, the communication controller 105 controls the start of a signal reception standby operation, the end of the signal reception standby operation (i.e., shift to a sleep mode), data transmission timing, etc.

The communication unit 106 transmits, to the destination communication terminal 110, data stored in the storage 104, or transfers, to the storage 104, data output from the destination communication terminal.

Figure 2:
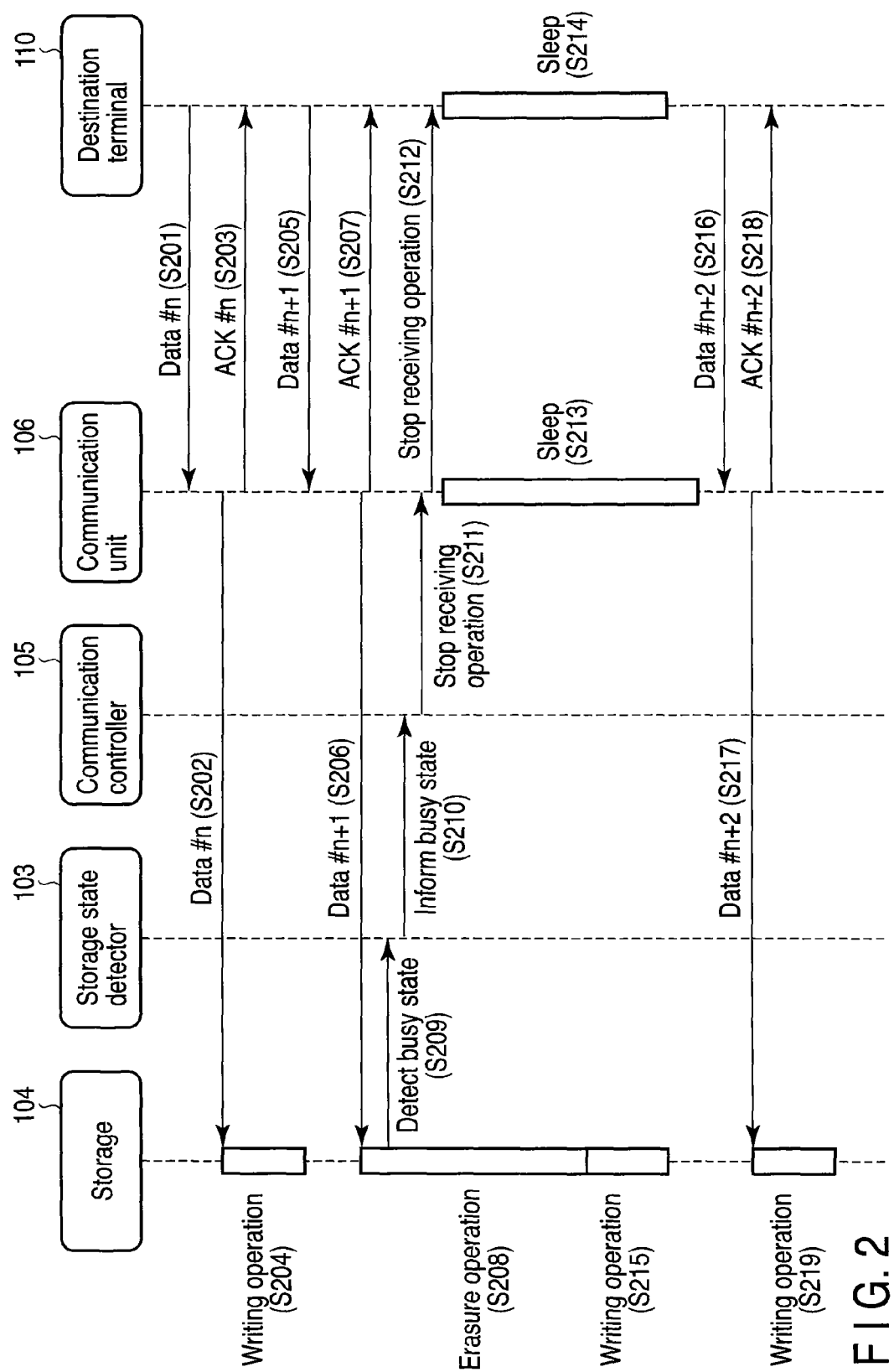
FIG. 2 is an exemplary sequence chart useful in explaining exchange of information between modules in the communication apparatus of the embodiment and a destination terminal.

Referring then to FIG. 2, a description will be given of a sequence example useful in explaining exchange of messages between modules in the communication terminal 101 and the destination communication terminal 110. Although the operations of the modules and the data transfer therebetween are executed under the control of the total controller 102, the operations of the total controller 102 are omitted for simplifying the entire description.

If the communication unit 106 of the communication terminal 101 has succeeded in receiving Data #n (#n is a sequence number and serves as an identifier for a data packet) from the destination communication terminal 110 (step S201), it transmits ACK #n as an acknowledgement response to the destination communication terminal 110 (step S203). At the same time, or after or before the transmission of ACK #n, the communication unit 106 of the communication terminal 101 transfers Data #n to the storage 104 (step S202), whereby Data #n is stored therein (step S204).

If the communication unit 106 of the communication terminal 101 has succeeded in receiving Data #(n+1) transmitted from the destination communication terminal 110 (step S205), it transmits ACK #(n+1) as an acknowledgement response to the destination communication terminal 110 (step S207), and transfers Data #(n+1) to the storage 104 (step S206). Assume here that the storage state detector 103 has detected the busy state of the storage 104 (step S209), and also assume that Data #(n+1) is saved in a buffer (not shown) incorporated in the communication unit 106 or the storage 104. The storage state detector 103 having detected the busy state informs the communication controller 105 that the storage 104 is in the busy state (step S210).

The communication controller 105, in turn, supplies the communication unit 106 with a command to shift to the sleep mode for stopping its reception operation (step S211), and simultaneously operates a timer (not shown). The timer sets a time period (a first predetermined time period) corresponding to the time period for which the busy state continues. A method of determining the busy state duration time will be described later.

Upon receiving the command to stop the receiving operation, the communication unit 106 informs the destination communication terminal 110 that the communication terminal 101 will enter the sleep mode (receiving operation stop mode) (step S212), and then the communication terminal 101 enters the sleep mode for stopping its receiving operation (step S213). At this time, the busy state duration time is reported to the destination communication terminal 110. Upon being informed that the communication terminal 101 will enter the sleep mode, the destination communication terminal 110 enters a sleep mode for stopping data transmission for the informed busy state duration time (step S214). In this sleep mode, data transmission is stopped for a predetermined time period less than the first predetermined time period. When the communication units of the communication terminal 101 and the destination communication terminal 110 are in the respective sleep modes, the storage 104 returns from the busy state and finishes the writing of Data #(n+1) saved in the buffer (step S215).

After the timer counts the time period set therein, the communication controller 105 supplies the communication unit 106 with a command to resume the receiving operation, and stops the timer. Upon receiving the command to resume the receiving operation, the communication unit 106 enters a standby state for receiving data transferred from the destination communication terminal 110. Similarly, the destination communication terminal 110 resumes transmission of Data #(n+2) (step S216). The following steps are similar to step S201, et seq.

The storage state detector 103 will be described in detail. Assume here that the storage 104 is, for example, a flash memory. Since in a flash memory, data cannot be overwritten in an area in which data is already written, the data already written in the area must be erased. For this erasure, several milliseconds may be required. The state in which an erasure operation is performed (step S208) is defined as the storage busy state. Several method examples of detecting the busy state of the flash memory will now be described.

In a first method example, an interface for data communication is interposed between the storage 104 and the storage state detector 103 to generate a state informing signal indicating whether the storage 104 is in the busy state or the ready state, and to supply this signal to the storage state detector 103. The storage 104 may serve as a master for the interface, and positively inform the storage busy state. Alternatively, the storage state detector 103 may serve as a master for the interface, and constantly monitor the state of the storage 104. For instance, such a versatile interface as JTAG, UART, SPI, $I^2C$, may be used to enable the storage state detector 103 to monitor the state of the storage 104. Yet alternatively, the storage 104 may be formed of, for example, a flash memory chip, and be configured to output a 2-bit signal that can indicate four states, "idle state," "read state," "write state," and "erase state," while the storage state detector 103 detect, based on the 2-bit signal, whether the storage 104 has shifted to the erase state, and detect that the storage 104 is in the busy state if it is determined that the storage 104 has shifted to the erase state. Similarly, if the 2-bit signal indicates the "idle state," the storage state detector 103 detects that the storage 104 is in the idle state.

In a second method example, the storage state detector 103 measures the time elapsing until the storage 104 issues a write completion response after the total controller 102 or the communication unit 106 supplies a write request to the storage 104, and detects the state of the storage 104 based on the measured time. For instance, if the interval between the issuing of the write request and the issuing of the write completion response (or the completion of preparation for data writing) is shorter than a predetermined time period (a second predetermined time period), it is considered that no erasure operation is performed and hence the storage 104 is in the ready state. In contrast, if no write completion response is issued even after the predetermined time period (the second predetermined time period), it is considered that the storage 104 has entered the erasure operation and is therefore in the busy state. The predetermined time period is set longer than an average data writing period, and shorter than an average data erasure period.

In a third method example, the storage state detector 103 monitors changes in the power supply of the storage 104. For instance, the storage 104 may be formed of, for example, a flash memory chip, and the storage state detector 103 be configured to monitor the voltage or current of a power supply pin for the storage 104. More specifically, changes in the voltage or current of the power supply pin for the storage 104 are digitized using a comparator, an analog-to-digital converter (ADC). For instance, since flash memories require, because of their characteristics, a higher voltage for erasure operation than for reading and writing operations, more current flows therein to produce the higher voltage during erasure. Accordingly, the power supply voltage is temporarily reduced. These variation patterns during the erasure operation are beforehand stored, and by comparing an observed variation pattern with the stored patterns, it is determined that the erasure operation is started. More specifically, variations in the power supply voltage may be sampled at regular intervals, and if the cross-correlation value of a variation with respect to a predetermined pattern exceeds a threshold value, it is determined that the erasure operation is performed. Alternatively, variations in the power supply voltage may be sampled at regular intervals, and if the sampled voltage is lower than a predetermined value, it is determined that a great amount of current has flown, and that this is because of the erasure operation.

A description will hereinafter be given of examples where the storage 104 is a disk drive, such as a HDD or DVD. In the disk drive, a physical data write position is determined by moving a head over a disk. If the physical positions of data items to be subsequently written are far from each other, the data items are written to tracks that are physically far from each other. A certain time (seek time) is required to move the head to a target one of the tracks before starting writing data thereto. The seek time depends on the current position of the head. There is a case where several milliseconds are necessary. In the disk drive, the state in which a seek operation is performed is defined as the storage busy state. Several method examples of detecting the busy state of the disk drive will be described below.

In a first method example, an interface for data communication is interposed between the storage 104 and the storage state detector 103 to enable the storage 104 to inform the storage state detector 103 whether the storage 104 is in the busy state or the ready state. The storage 104 may serve as a master for the interface, and positively inform the storage busy state. Alternatively, the storage state detector 103 may serve as a master for the interface, and constantly monitor the state of the storage 104. For instance, such a versatile interface as JTAG, UART, SPI, $I^2C$, may be used to enable the storage state detector 103 to monitor the state of the storage 104. Yet alternatively, the storage 104 may be a module for a disk drive, and be configured to output a 2-bit signal that can indicate four states, "idle state," "read state," "write state," and "seek operation state," while the storage state detector 103 detect, based on the 2-bit signal, whether the storage 104 has shifted to the seek operation state, and detect that the storage 104 is in the busy state if it is determined that the storage 104 has shifted to the seek operation state. Similarly, if the 2-bit signal indicates the "idle state," the storage state detector 103 detects that the storage 104 is in the idle state.

In a second method example, the storage state detector 103 measures the time elapsing until the storage 104 issues a write or read completion response after the total controller 102 or the communication unit 106 supplies a write or read request to the storage 104, and detects the state of the storage 104 based on the measured time. For instance, if the interval between the issuing of the write or read request and the issuing of the write or read completion response (or completion of preparation for accessing the subsequent data) is shorter than a predetermined time period (a second predetermined time period), it is considered that no seek operation is performed and hence the storage 104 is in the ready state. In contrast, if no write or read completion response is issued even after the predetermined time period (the second predetermined time period), it is considered that the storage 104 has entered the seek operation and is therefore in the busy state. The predetermined time period is set longer than an average data writing period, and shorter than an average seek operation period.

A description will be given of a method of determining the duration time (corresponding to the first predetermined time period) of the busy state. If the storage 104 is a flash memory, its erase state is regarded as the busy state, and hence the duration time of the busy state is set based on the average time period required for the erasure operation. On the other hand, if the storage 104 is a disk drive, its seek operation state is regarded as the busy state, and hence the duration time of the busy state is set based on the average seek operation period, and set at, for example, the average seek operation period itself.

Referring then to FIG. 3, a description will be given of a sequence example useful in explaining exchange of information between modules incorporated in the communication apparatus 101 and a destination communication terminal 110 in a way different from that of FIG. 2.

FIG. 3 differs from FIG. 2 in that the storage state detector 103 detects shift of the storage 104 to the ready state (step S301), as well as the shift to the busy state of the same. Further, the communication controller 105 does not incorporate a timer, and instructs the communication unit 106 to start its receiving operation when it is informed of the ready state by the storage state detector 103. For instance, in the case of the flash memory, the data receiving operation is stopped for the time period ranging from the completion of data erasure to the detection of the ready state of the flash memory by the controller.

The communication unit 106 informs the destination communication terminal 110 that the communication terminal 101 has started receiving (namely, requests the destination terminal 110 to resume data transmission). Upon receiving information indicating the start of a receiving operation (step S304), the destination communication terminal 110 returns an acknowledgment response (ACK) (step S305), and starts to transmit Data #(n+2) as a packet subsequent to Data #(n+1) whose transmission was interrupted (step S216).

In the above-described embodiment, since a sleep mode can be assumed by temporarily stopping reception and transmission of data in accordance with the state of the storage, low consumption of power can be realized. This function provides a significant advantage when, in particular, data transfer is performed by accessing a flash memory in which erasure operation often occurs, or by accessing a disk drive in which seek operation often occurs because of advanced file fragmentation.

As described above, the embodiment provides a communication apparatus and method that can realize low power consumption.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A communication apparatus comprising:
at least one antenna;
a storage unit configured to store information, the storage unit being an NAND type flash memory;
a state detecting unit configured to detect, at least one time during an operation of the communication apparatus, whether the storage unit is in a busy state in which no data writing is allowed, or in a ready state in which data writing is allowed;

a communication unit configured to perform communication with a destination communication apparatus; and a communication control unit configured to control the communication unit to inform the destination communication apparatus that a data receiving operation is stopped for a first time period, if the state detection unit detects that the storage unit has entered the busy state, wherein the state detection unit detects that the storage unit has entered the busy state if no write completion response is issued even after a second time period.

2. The apparatus according to claim 1, wherein busy state is a state in which the flash memory performs an erasure operation.

3. The apparatus according to claim 1, wherein the first time period is a time period for the flash memory to perform an erasure operation.

4. The apparatus according to claim 1, wherein the first time period is a time period for the flash memory to complete an erasure operation and for the state detecting unit to detect the ready state.

5. The apparatus according to claim 1, wherein the state detecting unit determines that the storage unit is in the ready state, if a write completion response is acquired from the storage unit within a second time period after a write request is issued to the storage unit, and determines that the storage unit is in the busy state, if no write completion response is acquired from the storage unit within the second time period after the write request is issued to the storage unit.

6. The apparatus according to claim 1, wherein the communication unit stops a data receiving operation when the state detecting unit detects the busy state, and resumes the data receiving operation when the first time period elapses.

7. The apparatus according to claim 1, wherein the communication unit stops a data receiving operation when the state detecting unit detects the busy state, and resumes the data receiving operation when the state detecting unit detects the ready state.

8. The apparatus according to claim 1, wherein if the state detecting unit detects the busy state, the communication control unit causes the communication unit to inform the destination communication apparatus that the data receiving operation is resumed.

9. The apparatus according to claim 1, wherein if the destination communication apparatus informs the communication unit that a data receiving operation is stopped for the first time period, the communication unit stops data transmission for a third time period less than the first time period.

10. The apparatus according to claim 1, wherein if the destination communication apparatus informs the communication unit that a data receiving operation is stopped, the communication unit stops data transmission, and if the destination communication apparatus informs the communication unit that the data receiving operation is resumed, the communication unit starts the data transmission.

11. A communication method comprising:

detecting, at least one time during communication, whether a storage unit for storing information is in a busy state in which no data writing is allowed, or in a ready state in which data writing is allowed;

performing communication with a destination communication apparatus via at least one antenna; and controlling communication to inform the destination communication apparatus that a data receiving operation is stopped for a first time period, when it is detected that the storage unit has entered the busy state.

12. A communication apparatus comprising:

at least one antenna;

a storage unit configured to store information, the storage unit being an NAND type flash memory;

a state detecting unit configured to detect, at least one time during an operation of the communication apparatus, whether the storage unit is in a busy state in which no data writing is allowed, or in a ready state in which data writing is allowed;

a communication unit configured to perform communication with a destination communication apparatus; and a communication control unit configured to control the communication unit to inform the destination communication apparatus that a data receiving operation is stopped for a first time period, if the state detection unit detects that the storage unit has entered the busy state, wherein the state detecting unit monitors a power voltage or a current of the flash memory, determines whether the flash memory is in the busy state, based on a variation in the power voltage or the current, and determines that the storage unit is in the ready state, when the first time period elapses after the flash memory is determined to be in the busy state.

13. A communication apparatus comprising:

at least one antenna;

a storage unit configured to store information, the storage unit being an NAND type flash memory;

a state detecting unit configured to detect, at least one time during an operation of the communication apparatus, whether the storage unit is in a busy state in which no data writing is allowed, or in a ready state in which data writing is allowed;

a communication unit configured to perform communication with a destination communication apparatus; and a communication control unit configured to control the communication unit to inform the destination communication apparatus that a data receiving operation is stopped for a first time period, if the state detection unit detects that the storage unit has entered the busy state, wherein if a cross-correlation value of a variation with respect to a predetermined pattern exceeds a threshold value, the state detection unit detects that the storage unit has entered the busy state.

* * * * *